US005880426A

United States Patent [19]

Fukui et al.

[11] Patent Number: 5,880,426

[45] Date of Patent: Mar. 9, 1999

[54] INDIRECTLY-COOLED PLASMA JET TORCH

[75] Inventors: Yasutaka Fukui; Shuichi Ohmori, both of Oarai-machi, Japan

[73] Assignee: Doryokuro Kakunenryo Kaihatsu Jigyodan, Tokyo, Japan

[21] Appl. No.: 917,758

[22] Filed: Aug. 27, 1997

[30] Foreign Application Priority Data

Aug. 28, 1996 [JP] Japan .................................... 8-226911

[51] Int. Cl.[6] .................................................... B23K 10/00

[52] U.S. Cl. ................................. 219/121.49; 219/121.5; 219/75

[58] Field of Search ......................... 219/121.49, 121.48, 219/74, 75, 121.5, 121.51; 313/231.31, 231.51

[56] References Cited

U.S. PATENT DOCUMENTS

| | | | |
|---|---|---|---|
| 3,194,941 | 7/1965 | Baird | 219/121.49 |
| 3,674,978 | 7/1972 | Becker et al. | 219/75 |
| 3,818,174 | 6/1974 | Camacho | 219/75 |
| 4,140,892 | 2/1979 | Muller | 219/75 |
| 4,445,021 | 4/1984 | Irons et al. | 219/121.49 |

*Primary Examiner*—Mark H. Paschall
*Attorney, Agent, or Firm*—Armstrong, Westerman, Hattori, McLeland, & Naughton

[57] ABSTRACT

An indirect cooling system suitable for a plasma jet cutting method is established to prevent the leakage of cooling water and to enable a stable plasma jet to be obtained. A tip having a nozzle for emitting a plasma jet is fitted to a nozzle sleeve through which cooling water circulates, and electric discharge is induced between the tip and an electrode extending through the nozzle sleeve to the neighborhood of the tip, thereby ionizing a neutral gas and emitting a plasma jet through the nozzle. In the indirectly-cooled plasma jet torch, the tip is brought into surface contact with the nozzle sleeve to fit them to each other, and contact portions of the tip and the nozzle sleeve are tapered.

4 Claims, 9 Drawing Sheets

| L (mm) | Temperature (°C) |
|---|---|
| 2.0 | 353 |
| 2.5 | 278 |
| 3.0 | 231 |
| 3.5 | 222 |
| 4.0 | 194 |

INDIRECTLY-COOLED PLASMA JET TORCH

BACKGROUND OF THE INVENTION

The present invention relates to a plasma jet torch usable as a cutting jig for decommissioning a nuclear fuel plant or as a cutting jig for cutting metallic and non-metallic materials. More specifically, the present invention relates to an indirectly-cooled plasma jet torch in which a tip having a nozzle for emitting a plasma jet is fitted to a nozzle sleeve through which cooling water circulates, and electric discharge is induced between the tip and an electrode extending through the nozzle sleeve to the neighborhood of the tip, thereby ionizing a neutral gas and emitting a plasma jet through the nozzle.

As the temperature rises, a substance changes from a liquid to a gas, and if the temperature is further raised, atoms move vigorously, and the substance eventually reaches a state in which freely moving positive and negative charged particles coexist together and the gas is electrically neutral. The gas in this state is known as "plasma". When a plasma generated by gas discharge is jetted out through a fine opening (nozzle) in a cooled metal (tip), a high-temperature and high-velocity gas stream is produced. This is called "plasma jet". Because the periphery (tip) of the gas stream, which has high conductivity, is cooled, the electric current concentrates in the central part. When the gas stream is accompanied by an electric current, the diameter of the gas stream is narrowed. Therefore, it is possible to obtain a plasma jet having a much smaller cross-section than in the case of ordinary discharge and a high temperature (from 10,000° C. to 20,000° C.).

Plasma cutting methods using such a high-temperature plasma include a plasma arc cutting method for cutting metals, and a plasma jet cutting method for cutting metallic and non-metallic materials. According to the plasma arc cutting method, a metallic workpiece is cut by a plasma jet created by passing an electric current between an electrode and the workpiece.

The plasma jet cutting method will be described below more specifically with reference to FIG. 1 of the accompanying drawings. A working gas (e.g. argon gas) is supplied between a tungsten electrode 1 and a tip 2. The gas is ionized by high-frequency arc discharge induced by a high-frequency generator 4, and an arc current is continuously supplied from a plasma power supply apparatus 3 to generate a plasma by the heat of arc energy. The thermal expansion of the plasma gas itself causes a plasma jet 5 to emit from the nozzle of the tip 2 to thereby cut a workpiece 6. Because the tip 2 is exposed to the high temperature of the plasma jet 5, it will melt if the tip 2 is left as it is. Therefore, the tip 2 is cooled by circulating cooling water through it. With the plasma jet cutting method, it is possible to cut non-conductive materials such as refractory brick and concrete because the arc current does not flow through the workpiece 6. However, the energy density of the plasma jet thus formed rapidly reduces as the distance from the nozzle increases, and the thermal efficiency with respect to the workpiece is as low as 10% to 20% (the thermal efficiency of the plasma arc cutting method is from 60% to 70%). Thus, the plasma jet cutting method is not efficient; therefore, it is not generally put into practical use in the present state of art. As a commercially available product, there is a Class 30A torch. In some rare cases, the plasma jet cutting method is applied to welding and thermal spraying.

However, in decommissioning of a nuclear fuel plant, the plasma jet cutting method can be effectively applied to a cutting jig for decommissioning because devices constituting a nuclear fuel plant vary widely in terms of both material and shape, i.e. concrete, plastics, etc., and it is possible to cut metallic and non-metallic materials by the plasma jet cutting method. Therefore, we made a compact and lightweight plasma jet torch on an experimental basis, and carried out tests on the plasma jet torch by using the material, shape, etc. of the tip as parameters. Thus, we have already proposed a practical torch tip capable of ensuring a stable plasma jet and of cutting a metal plate having a thickness of about 45 millimeters (made of SUS304) [see Japanese Patent Application Unexamined Publication (KOKAI) No. 7-32157].

FIG. 2 is a diagram illustrating the above-described practical torch tip. The material used to constitute the torch tip is a Cu—Zr alloy. The nozzle diameter a is from 3.0 millimeters to 3.5 millimeters. The nozzle constriction ratio (the ratio b/a of the length b of the nozzle constricting portion to the nozzle diameter a) is from 2.5 to 3. Thus, the torch tip is made compact and lightweight, improved in durability and arranged to form a stable plasma jet.

However, the practical torch tip shown in FIG. 2 has a problem in terms of maintenance. More specifically, to improve the thermal pinch effect of the plasma jet (i.e. the effect in which the plasma jet is constricted by cooling from the surroundings to become a high-temperature plasma jet), the torch tip adopts a direct cooling system in which water is circulated through the tip. Because the tip is an expendable part, it must be replaced after use for about 5 hours. Therefore, in the case of the direct cooling system, when the tip is detached from the nozzle sleeve (a part to which the tip is fitted and which supplies cooling water into the tip), cooling water leaks. Thus, the torch tip shown in FIG. 2 suffers from a problem in terms of maintenance.

The cooling water circulating path in the direct cooling system will be described below with reference to FIG. 3.

Cooling water is supplied from a cooling water tank 11 and a radiator 12, which are installed in a plasma power supply apparatus 3, to a plasma jet torch body 20 through a strainer 13 by a pump 14. The cooling water supplied to the plasma jet torch body 20 flows into a tip 2 through a cooling water (incoming) line 21*a* provided in a nozzle sleeve 21 to which the tip 2 is fitted. After circulating through the tip 2, cooling water returns to the plasma power supply apparatus 3 through a cooling water (outgoing) line 21*b* provided in the nozzle sleeve 21. Because of the described structure, the tip 2 serves as a cover for the nozzle sleeve 21, and when the tip 2 is detached from the nozzle sleeve 21, the lines 21*a* and 21*b* in the nozzle sleeve 21 are completely opened. Consequently, cooling water remaining in the pipe leaks. It should be noted that reference numeral 16 shown at the plasma power supply apparatus 3 denotes a water supply port, and reference numeral 17 denotes a drain for overflow.

In a case where plasma equipment is used in decommissioning of a nuclear fuel plant or the like, it is a general practice to install the plasma power supply apparatus in a green area because it has a large size [1038 millimeters (W)×1551 millimeters (L)×1308 millimeters (H)] and to dispose the plasma jet torch body in a red area. Accordingly, if cooling water leaking when the tip is removed becomes radioactive waste under the influence of devices installed in the red area, the radioactive waste is likely to circulate through the plasma power supply apparatus. Therefore, it is necessary to maintain the water sealing properties from the viewpoint of preventing contamination.

Incidentally, an indirect cooling system that is generally used for the plasma arc cutting method may be effectively employed to prevent the leakage of cooling water during tip replacement and the radioactive contamination of cooling water. In the indirect cooling system, cooling water circulates through the distal end of a nozzle sleeve to which a tip is fitted. The tip is fitted to the cooled nozzle sleeve by thread engagement. Thus, the tip is cooled by heat transfer from the nozzle sleeve. With the indirect cooling system, no cooling water leaks when the tip is detached from the nozzle sleeve. Therefore, to apply the indirect cooling system to the plasma jet cutting method, we experimentally produced an indirectly-cooled torch having an insulating insert (ceramics) interposed between a nozzle sleeve and an electrode and arranged to apply a voltage between the electrode and a tip. With this trial product, however, the created plasma jet was unstable. Moreover, the tip became red-hot in several seconds after the start of emission of a plasma jet, and the distal end of the tip melted. Therefore, the indirect cooling system for the plasma arc cutting method cannot be employed as it is for cooling a tip used in the plasma jet cutting method, and it is necessary to establish an indirect cooling system suitable for the plasma jet cutting method.

SUMMARY OF THE INVENTION

In view of the above-described circumstances, an object of the present invention is to establish an indirect cooling system suitable for the plasma jet cutting method in order to apply the plasma jet cutting method to decommissioning of a nuclear fuel plant or the like by improving the tip cooling system for the compact and lightweight plasma jet torch (practical torch), which we have developed so far, such that the direct cooling system is changed to an indirect cooling system, thereby preventing the leakage of cooling water during replacement of tips, which are expendable parts, and thus achieving an improvement in maintenance and enabling a stable plasma jet to be obtained.

In decommissioning of a nuclear fuel plant, the plasma jet cutting method can be effectively used because it is capable of cutting metallic and non-metallic materials. However, the plasma jet cutting method is not generally put into practical use in the present state of art because of low cutting capacity and so forth.

To put the plasma jet cutting method into practical use as a cutting jig for decommissioning, we developed a compact A and lightweight practical torch capable of ensuring a stable plasma jet and of cutting a metal plate having a thickness of about 45 millimeters (made of SUS304). However, the practical torch adopts a direct cooling system for cooling the tip, in which water circulates through the tip. Therefore, cooling water leaks when the tip, which is an expendable part, is detached. Thus, the practical torch has a problem in terms of maintenance. We experimentally produced an indirectly-cooled torch employing the indirect cooling system generally used for the plasma arc cutting method. However, it was impossible to apply the indirectly-cooled torch to the plasma jet cutting method. Under these circumstances, the present invention provides an indirectly-cooled plasma jet torch designed and produced by using a heat conduction analysis for the purpose of establishing an indirect cooling system suitable for the plasma jet cutting method and achieving an improvement in maintenance.

In the indirectly-cooled plasma jet torch according to the present invention, cooling water circulates through the distal end of a nozzle sleeve to which a tip is fitted, and the tip is cooled by heat transfer from the nozzle sleeve. Therefore, no cooling water leaks during tip replacement. To improve the heat transfer efficiency, the nozzle sleeve is made of the same material (Cu—Zr alloy) as that of the tip. Moreover, to ensure a surface contact ratio of 70% or more, obtained by analysis, the fitting portions of the tip and the nozzle sleeve are tapered and brought into surface contact with each other. The indirectly-cooled plasma jet torch according to the present invention is capable of ensuring a stable plasma jet and of cutting a metal plate having a thickness of about 35 millimeters (made of SUS304) and hence possible to employ as a cutting jig for decommissioning.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 8(*b*) shows analytic points on the tip A.

DESCRIPTION OF THE PREFERRED EMBODIMENTS

An embodiment of the present invention will be described below.

We carried out an analysis of cooling efficiency using a general-purpose finite element nonlinear structural analysis system (FINAS) for the purpose of establishing an indirect cooling system suitable for the plasma jet cutting method and thereby achieving an improvement in maintenance and preventing radioactive contamination of cooling water, and developed an indirectly-cooled plasma jet torch.

The FINAS was developed as a general-purpose structural analysis program having extensive nonlinear analysis functions including an inelastic analytic method, which is a characteristic analytic method in the field of fast breeder reactors. The FINAS has various functions such as a static stress analysis, a dynamic stress analysis, and a heat conduction analysis. In the present invention, the tip cooling efficiency was analyzed by using the heat conduction analysis.

The present invention will be described below more specifically.

(i) Temperature analysis of a directly-cooled tip

In the analysis, a model (tip) is divided into a finite number of elements, and each matrix is prepared to perform matrix calculation. A general basic equation for the heat conduction analysis may be expressed as follows:

$$[C]\Delta\{dT/dt\}+([K_1]+[K_2])\Delta\{T\}=\Delta\{Q_1\}+\Delta\{Q_2\}+\Delta\{Q_3\}$$

where:

[C]: heat quantity matrix $[K_1]$: heat conduction matrix $[K_2]$: heat conduction matrix or heat conduction link matrix $\Delta\{T\}$: node temperature incremental vector $\Delta\{dT/dt\}$: differential of node temperature with respect to time $\Delta\{Q_1\}$: node heat flow incremental vector equivalent to heat generation $\Delta\{Q_2\}$: node heat flow incremental vector equivalent to heat input $\Delta\{Q_3\}$: node heat flow incremental vector due to heat transfer and radiation The left-hand side terms of the above equation, i.e. $[C]\Delta\{dT/dt\}$ and $([K_1]+[K_2])\Delta\{T\}$, represent the amount of heat transferred from the tip to cooling water. On the right-hand side of the above equation, the term $\Delta\{Q_1\}$ represents the amount of heat generated by the tip; the term $\Delta\{Q_2\}$ represents the amount of heat transferred to cooling water by heat conduction; and the term $\Delta\{Q_3\}$ represents the amount of heat transferred by radiation.

Figure 4:
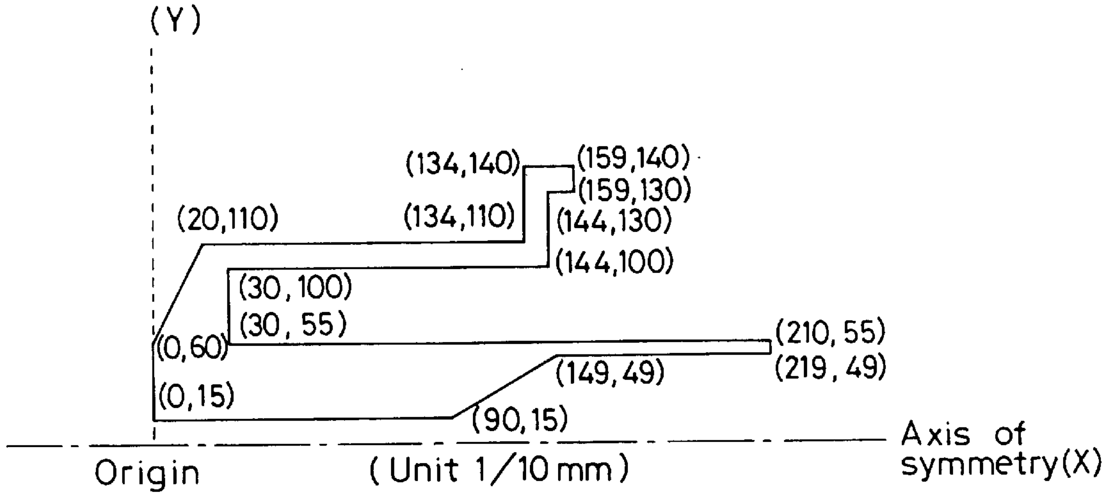
FIG. 4 shows a model of an indirectly-cooled tip.
Figure 5:
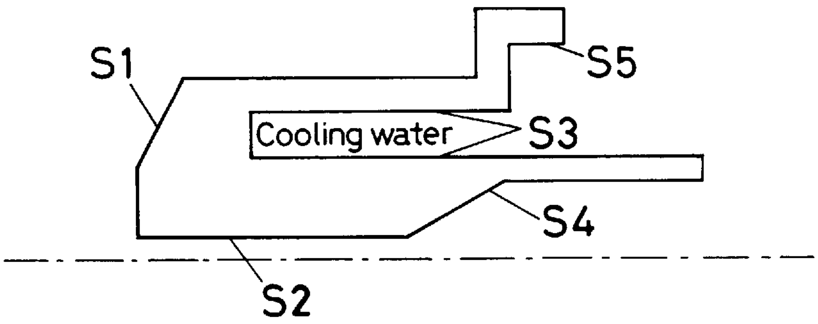
FIG. 5 shows boundary conditions of an indirect cooling system.

To analyze the tip temperature during the emission of a plasma jet by using the FINAS, it is necessary to confirm the values of physical properties, boundary conditions, etc. to be inputted. Therefore, the analysis was carried out by using a directly-cooled tip (assumed to be tip A), for which results of the analysis had already been obtained, and by inputting the values of physical properties shown below, a model of an indirectly-cooled tip shown in FIG. 4, and boundary conditions of an indirect cooling system shown in FIG. 5. FIG. 4 is a sectional view showing a tip half with respect to the axis of symmetry. The coordinate values of each point defining the tip configuration were set as shown in FIG. 4. The boundary conditions shown in FIG. 5 were heat transfer from the tip outer surface S1 to the outside air, transfer of heat from the nozzle inner surface S2 by the plasma, the measured value of temperature at the nozzle sleeve inner surface S3 (cooled by cooling water), and surfaces S4 and S5, which were defined as adiabatic conditions.

<Values of physical properties>

| | |
|---|---|
| ① Structural member (tip) | |
| Material | Cu-Zr alloy (Cu > 99.5%, Zr = 0.10 to 0.20%) |
| Thermal conductivity: | γ = 0.8 Cal/cm · sec · °C. |
| Specific gravity | ρ = 8.98 × 0.9985 + 6.489 × 0.0015 =8.9563 g/cc (20° C.) |
| Specific heat | C = 0.095 × 0.9985 + 6.489 × 0.0015 =0.09496 Cal/g. °C. (20° C.) |
| ② Cooling water (used to calculate $Q_{water}$) | |
| Flow rate | w = 3 l/min = 3000 $cm^3$/min |
| Specific gravity | ρ = 1.0 g/$cm^3$ |
| Specific heat | C = 4.18 J/gK (20° C.) |
| Average temperature rise: | δT = 12° C. (measured value) |
| Weight flow rate | W = ρw = 3000 g/min |
| Amount of heat taken by cooling water | $Q_{water}$ = W × C × δT =3000 × 4.18 × 12 J/min =1.5 × $10^5$ J/min |
| ③ Outside air | |
| Heat transfer coefficient: | h = 0 (adiabatic) |
| ④ Plasma | |
| Current: 250 A | |
| Voltage: 100 V | |
| Amount of heat generated by plasma | $Q_{plasma}$ = I·V [Watt = J/sec] =2.5 × $10^4$ J/sec =1.5 e × $10^5$ J/min |

It should be noted that because the tip heated to a high temperature by the emission of a plasma jet is cooled by cooling water, the heat conduction analysis of the tip cannot be performed unless the amount of heat taken by cooling water ($Q_{water}$) is previously obtained. Therefore, to obtain $Q_{water}$, the average temperature rise δT was set equal to 12° C. (measured value). More specifically, thermocouples were set in the cooling water (incoming) and (outgoing) lines to measure cooling water temperatures during the plasma jet emission. The temperature difference between the cooling water (incoming) and (outgoing) lines was 12° C. both immediately after and 3 minutes after the start of the plasma jet emission. Therefore, $Q_{water}$ was calculated by setting δT equal to 12° C.

Figure 6:
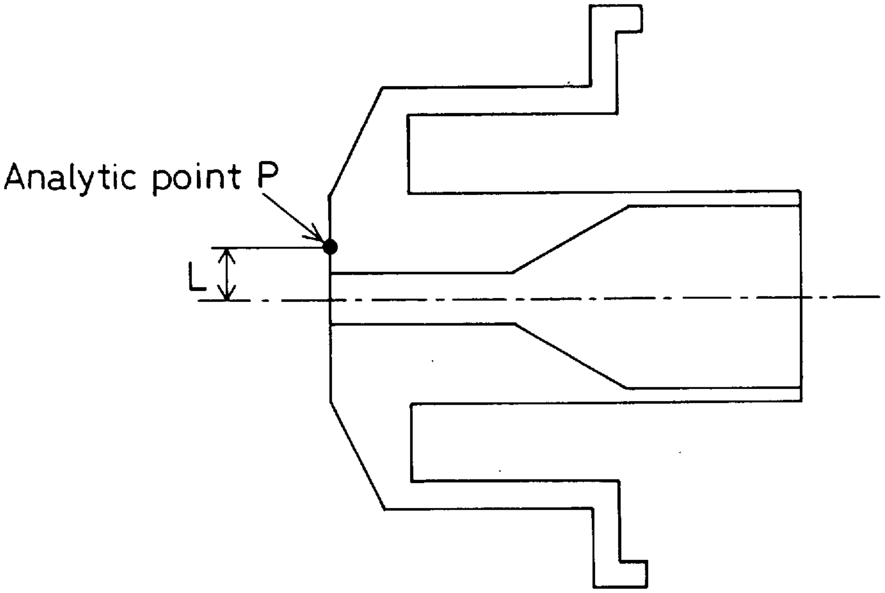
FIG. 6 shows an analytic point on a directly-cooled tip A.
Figure 7:
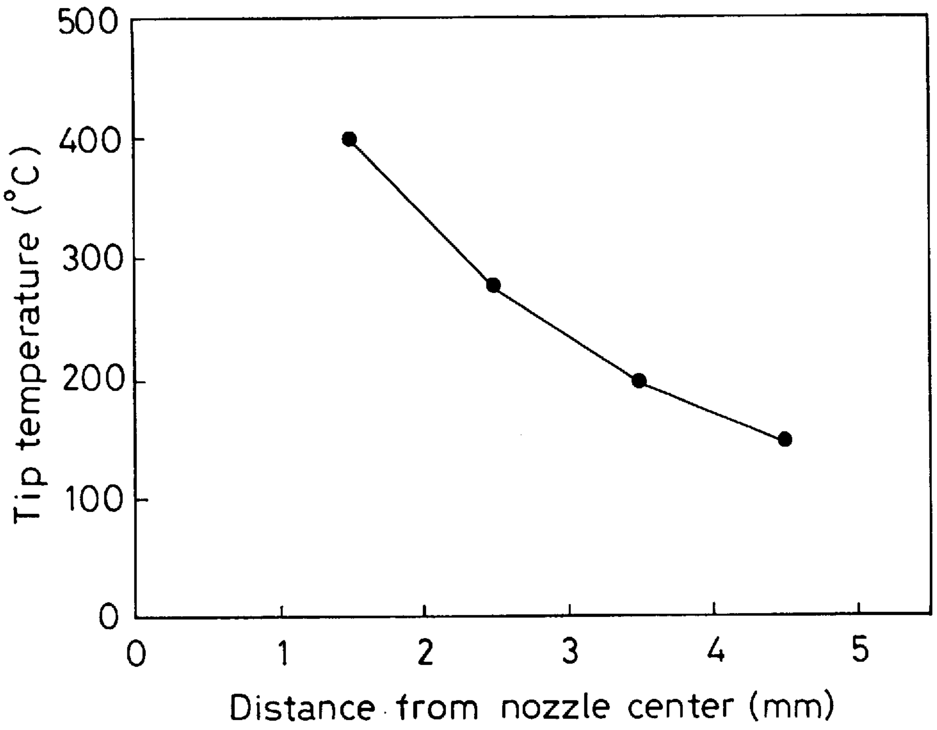
FIG. 7 is a graph showing results of an analysis of temperature at the analytic point of the tip A during the emission of a plasma jet.

FIG. 6 shows an analytic point P on the directly-cooled tip A. FIG. 7 shows results of an analysis of temperature at the analytic point P on the tip A during the plasma jet emission for various L (distance from the nozzle center to the analytic point P), i.e. 1.5 millimeters, 2.5 millimeters, 3.5 millimeters, 4.5 millimeters, 5.5 millimeters, and 6.0 millimeters.

As will be clear from FIG. 7, as the distance from the nozzle center (i.e. the center of the plasma jet) increased, the tip temperature became lower; the tip temperature reached about 400° C. at the position closest to the plasma jet.

Figure 8:
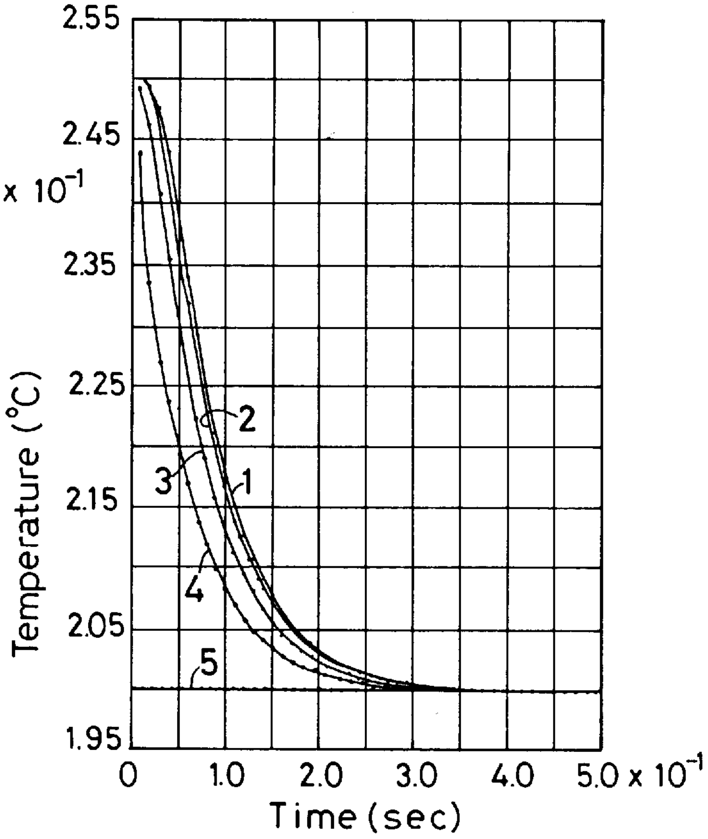
FIG. 8(*a*) is a graph showing results of an analysis of time taken for the tip A to reach the same temperature as the cooling water temperature.
Figure 8:
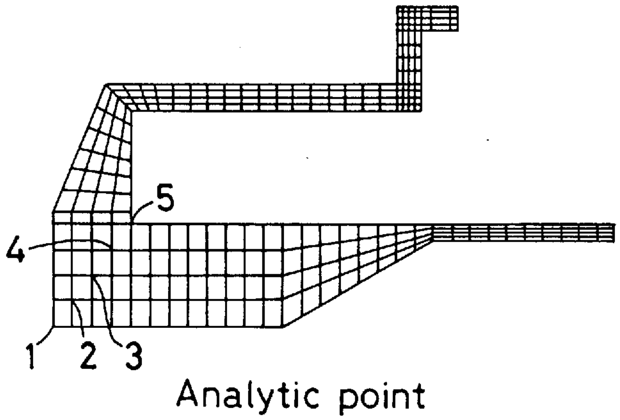

FIG. 8(*a*) shows results of an analysis in which the temperature of the tip A and the cooling water temperature were arbitrarily set, and the time taken for the tip A to reach the same temperature as the cooling water temperature (i.e. cooling efficiency or speed) was analyzed.

In the graph of FIG. 8(*a*), the abscissa axis represents time (sec), and the ordinate axis represents temperature °C.). The graph shows temperature changes at analytic points 1, 2, 3, 4 and 5 shown in FIG. 8(*b*). As shown in FIG. 8(*a*), at any of the analytic points, the temperature of the tip A became the same as the cooling water temperature in 0.37 second.

Figures 9, 10:
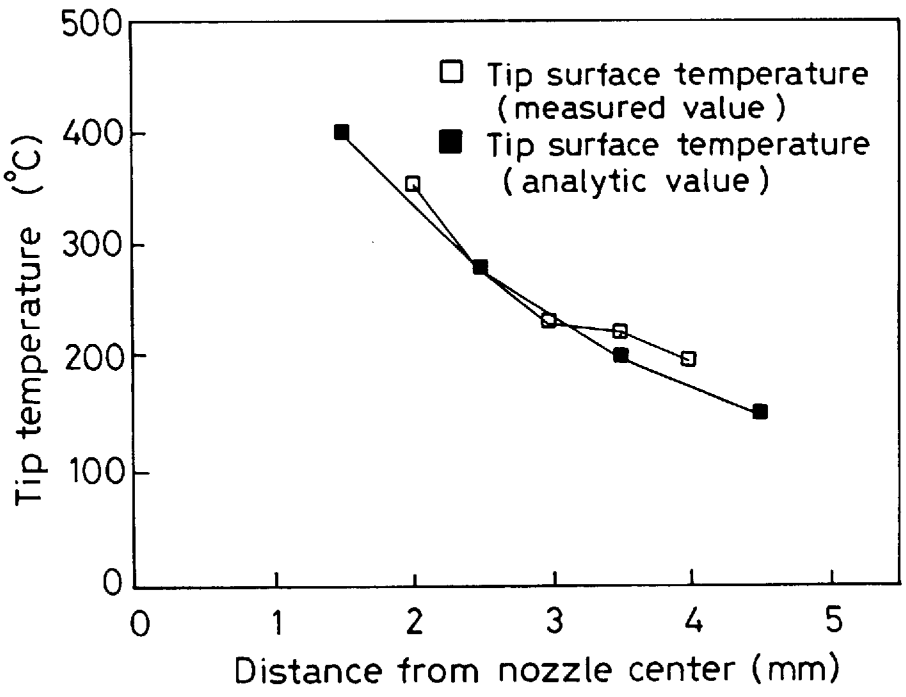
FIG. 9 is a table showing results of measurement of temperatures at the analytic points of the distal end of the tip A by a thermocouple.
FIG. 10 is a graph in which the results of the analysis of temperature of the tip A during the plasma jet emission and the results of the measurement of the tip distal end temperatures are shown superimposed on one another.

Next, the tip end temperature was actually measured by using a thermocouple to confirm the reliability of the analysis results (input data). Consequently, results as shown in FIG. 9 were obtained. FIG. 10 is a graph showing the measurement results as superimposed on the graph of FIG. 7. As will be understood from FIG. 10, the analytic and measured curves of temperature changes have a similar slope. Therefore, it was confirmed that the input data and analytic technique used to analyze the directly-cooled tip A were healthy.

In analysis of heat conduction in an indirectly-cooled tip, if the results of the analysis are equal to those of the directly-cooled tip A, i.e. if the cooling speed is equal to 0.37 second, it is possible to predict that a stable plasma jet can be obtained even with the indirectly-cooled tip, and that the wear of the tip will be extremely small. However, if the cooling speed is slower than 0.37 second, it is impossible to judge what level of cooling speed should be attained to obtain a stable plasma jet and to minimize the wear of the tip. Therefore, in order to grasp previously a cooling speed at which a stable plasma jet can be obtained and the wear of the tip is favorably small, we produced a tip B of the direct cooling type having the cooling efficiency reduced to a certain level, as a tip simulating the indirect cooling system, and obtained a cooling speed according to the thermal analysis code.

Figure 1:
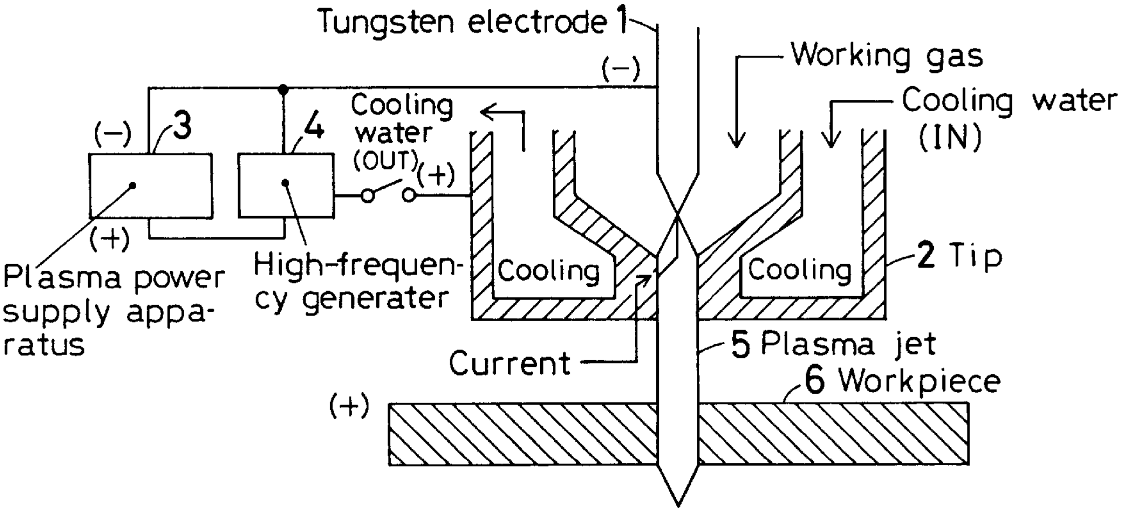
FIG. 1 PRIOR ART
FIG. 1 is a diagram illustrating a plasma jet cutting method.
Figure 2:
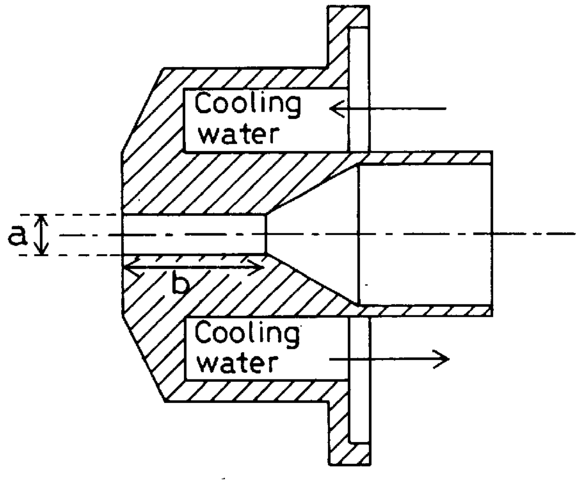
FIG. 2 PRIOR ART
FIG. 2 is a diagram illustrating a practical torch tip.
Figure 3:
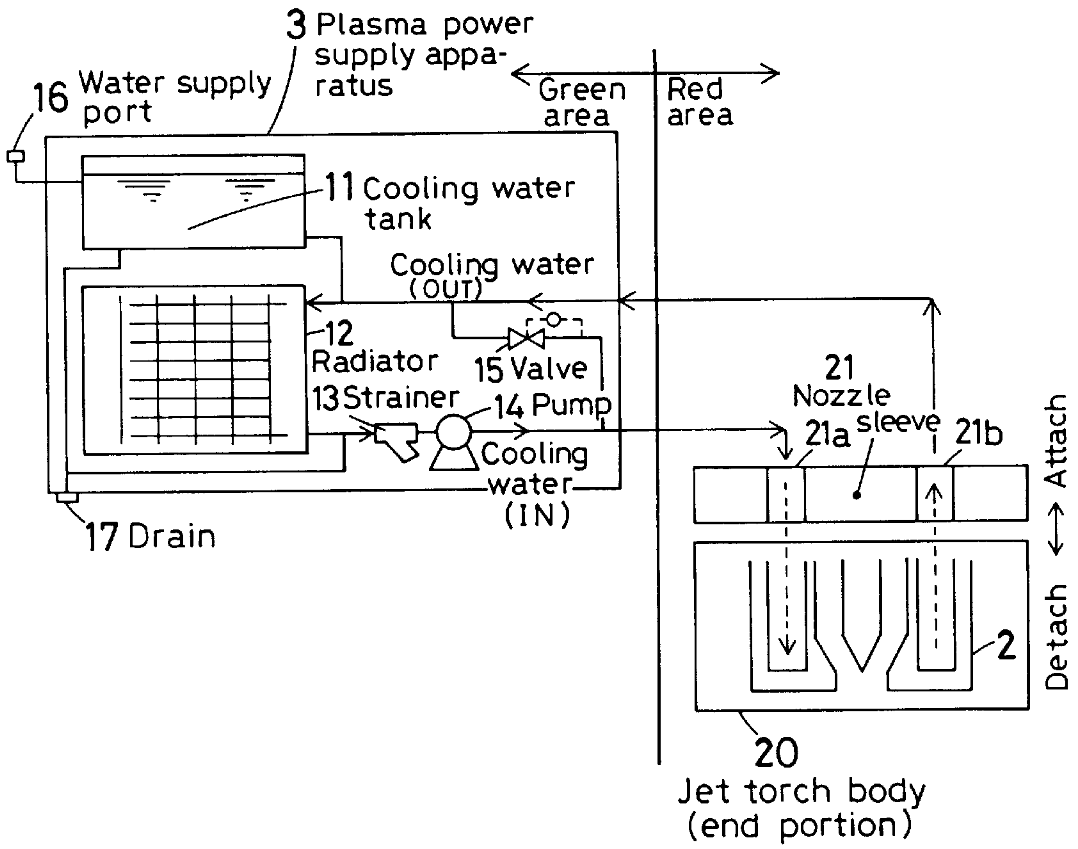
FIG. 3 shows a cooling water circulating path in a direct cooling system.
Figure 11:
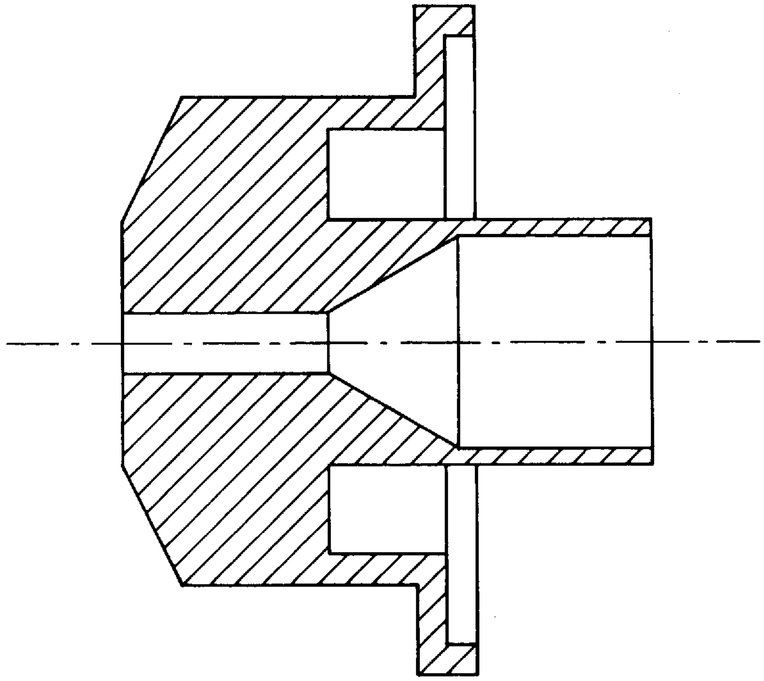
FIG. 11 shows a tip B simulating the indirect cooling system.

It should be noted that the tip B of the direct cooling type having the cooling efficiency reduced to a certain level was formed such that, as shown in FIG. 11, the cooling water circulating passage (volume) in the tip was reduced from about 2.5 $cm^3$ (tip A; see FIG. 2) to about 1.1 $cm^3$ (tip B).

Figure 12:
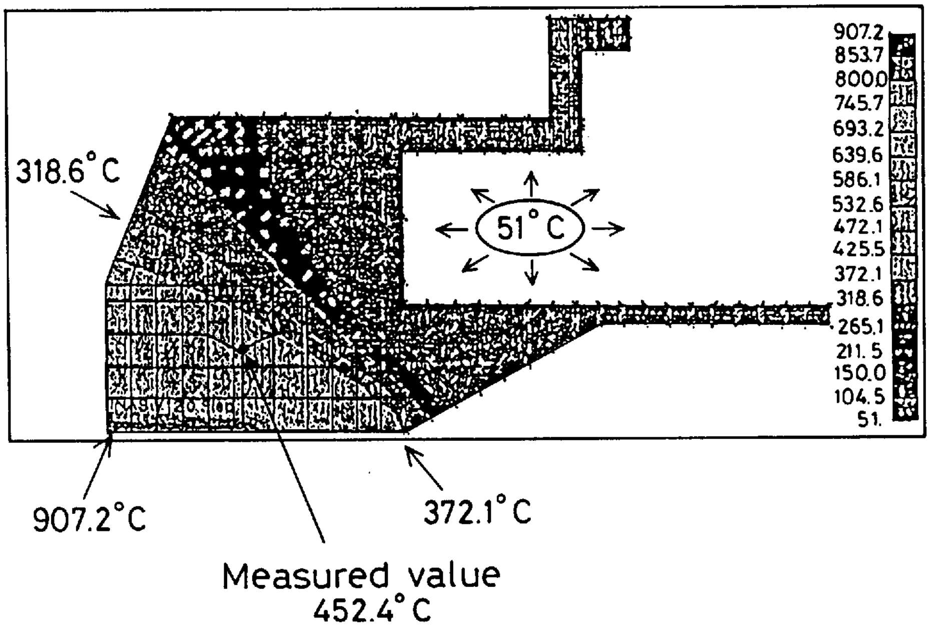
FIG. 12 shows results of an analysis of temperature of the tip B during the emission of a plasma jet.

In a test using the tip B, a stable plasma jet was obtained. Results of an analysis of temperature of the tip B during the plasma jet emission by the FINAS revealed that, as shown in FIG. 12, the temperature at the distal end of the tip B was 907.2° C., that is, it reached a level near the melting point of the tip B (the same is the case with the tip A), i.e. 980° C. An analysis of cooling efficiency revealed that the time taken for the tip B to reach the same temperature as the cooling water temperature was 1.64 seconds, i.e. about 4.5 times as long as the time taken for the tip A having a cooling water circulating passage volume of about 2.5 $cm^3$.

Accordingly, it is considered that the cooling efficiency of an indirectly-cooled tip must be in the range of from 0.37 second to 1.64 seconds in order to obtain a stable plasma jet, and that the tip becomes red-hot and melts in several seconds after the start of emission of a plasma jet.

(ii) Modeling of indirectly-cooled tip

We found that when the indirect cooling system is adopted as a tip cooling system, the above-described indirectly-cooled tip produced on an experimental basis is incapable of sufficiently transferring heat from the nozzle sleeve to the tip partly because the portion necessary to cool (i.e. the nozzle constricting portion) is of a screwed type. Accordingly, to improve the efficiency of heat transfer from the cooled nozzle sleeve, the following schemes are conceivable:

① To make the nozzle sleeve of the same material as that of the tip.

② To improve the ratio of surface contact between the tip and the nozzle constricting portion of the nozzle sleeve.

Therefore, we developed a model improved in the method of fitting the tip to the nozzle sleeve and in the ratio of surface contact between the nozzle sleeve and the tip by forming the nozzle sleeve, which has heretofore been made of brass, using a Cu—Zr alloy, which is the same material as that of the tip.

Figure 13:
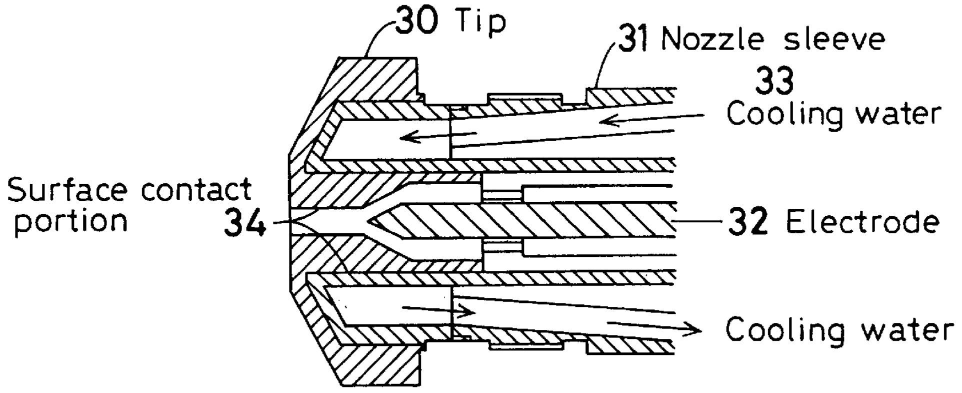
FIG. 13 is a diagram illustrating a tip according to the present invention.

FIG. 13 is a diagram illustrating a tip developed according to the present invention.

A modeled indirectly-cooled tip 30 is fitted to a nozzle sleeve 31 cooled at the periphery of the nozzle constricting portion thereof. The tip 30 contacts the nozzle sleeve 31 at a surface contact portion 34 thereof. To improve the ratio of surface contact between the tip 30 and the nozzle sleeve 31, an end surface from the outer diameter of the nozzle sleeve 31 to the inner diameter of the nozzle sleeve 31 is tapered toward the inner part of the fitting engagement between the tip 30 and the nozzle sleeve 31 such that the fitting portions of these members are tapered at a rate of taper of 1/50. It should be noted that the rate of taper is not necessarily limited to 1/50, but may be appropriately set according to need. The reason for providing such taper is as follows. To fit a non-tapered projection into a non-tapered recess, it is necessary to increase the inner diameter of the recess in the tip and to reduce the outer diameter of the projection (e.g. the nozzle sleeve). Consequently, the surface contact ratio is undesirably reduced by the effect of a gap increasing according to the amount by which the inner diameter of the recess is increased. Therefore, the fitting portions of the tip 30 and the nozzle sleeve 31 are tapered in order to avoid the reduction of the surface contact ratio.

(iii) Cooling efficiency analysis of indirectly-cooled tip

The cooling efficiency (i.e. the time taken for the tip to reach the same temperature as the cooling water temperature) was analyzed by the FINAS using the model tip shown in FIG. 13 and using the surface contact ratio at the surface contact portions 34 of the tip 30 and the nozzle sleeve 31 as a parameter (from 70% to 100%). As a result, the tip cooling efficiency when the surface contact ratio was 100% was 0.78 second. When the surface contact ratio was from 70% to 80%, the tip cooling efficiency was 0.96 second. As has been stated above, the cooling efficiency necessary for the indirect cooling system is in the range of from 0.37 second to 1.64 seconds. Therefore, it was confirmed that the indirectly-cooled model tip according to the present invention having a cooling efficiency of 0.78 to 0.96 second was capable of providing a stable plasma jet.

(iv) Production of indirectly-cooled torch

Next, we produced an indirectly-cooled plasma jet torch on the basis of the analysis results described in the above section (iii) and the model of indirectly-cooled tip shown in FIG. 13. The torch thus produced is shown in FIG. 14.

Figure 14:
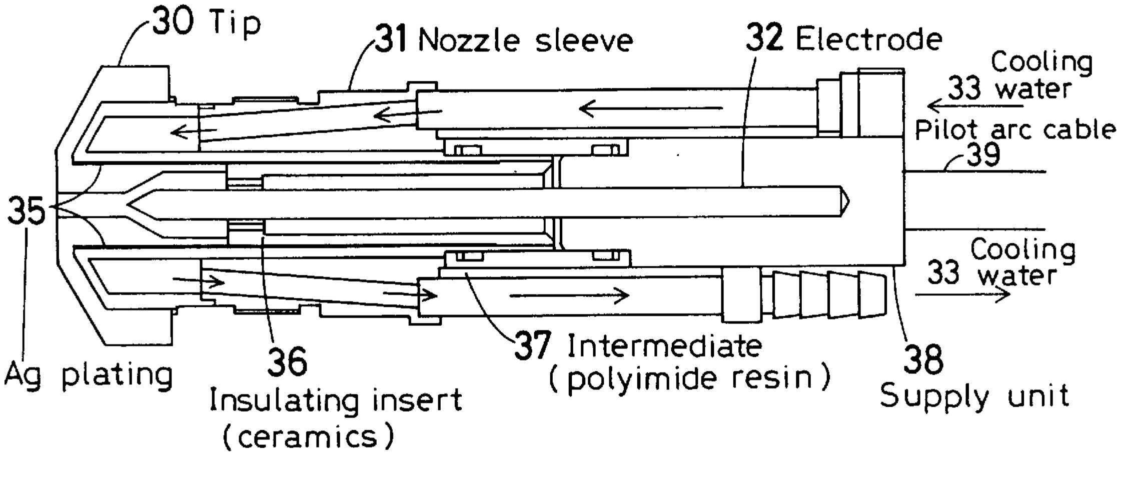
FIG. 14 shows an indirectly-cooled plasma jet torch produced on the basis of the model of indirectly-cooled tip shown in FIG. 13.

In the plasma jet torch shown in FIG. 14, the nozzle sleeve 31 is made of the same Cu—Zr alloy as that of the tip 30. The surface contact portions 34 of the tip 30 and the nozzle sleeve 31 are tapered at a rate of taper of 1/50. In a case where the tip and the nozzle sleeve are made of the same material and where the fitting portions of the two members are tapered, the tip and the nozzle sleeve are likely to stick fast to each other so that the tip, which is an expendable part, cannot be detached from the nozzle sleeve. Therefore, either of the contact portions of the tip 30 and the nozzle sleeve 31 (in this case, the contact portion of the nozzle sleeve 31) is provided with Ag plating 35 of 5 micrometers in thickness. Thus, a different kind of metal is interposed between the fitting portions of the tip 30 and the nozzle sleeve 31, thereby reducing the likelihood of the tip 30 becoming impossible to detach from the nozzle sleeve 31. It should be noted that Ag is a material having the highest thermal conductivity among metals; therefore, the Ag plating 35 has no effect on the efficiency of heat transfer from the nozzle sleeve 31 to the tip 30. Moreover, an insulating insert (ceramics) is interposed between the nozzle sleeve 31 and an electrode 32 to insulate these members from each other. It should be noted that reference numeral 37 in FIG. 14 denotes an intermediate (polyimide resin), and reference numeral 38 denotes a supply unit mounted on the head. Reference numeral 39 denotes a pilot arc cable. A plasma gas hose (not shown) is disposed around the pilot arc cable 39.

The production of a tip having a surface contact ratio of 90 to 100% with respect to the nozzle sleeve gives rise to a problem in terms of costs (i.e. even if 100 tips are produced, only about 20 tips have a surface contact ratio of 90 to 100% on account of the machining accuracy in production).

It is conceivable to increase the cone angle in order to raise the surface contact ratio. However, if the taper has an excessively large cone angle, it is likely that the tip fitted into the nozzle sleeve will stick fast to it and become impossible to remove (if hydraulic pressure or the like is used, the tip can be detached from the nozzle sleeve even in such a case; however, the tapered surface may be damaged). Therefore, according to a preferred embodiment, an indirectly-cooled plasma jet torch should have a rate of taper of 1/50, at which it is possible to ensure the required machining accuracy in production, and should have a surface contact ratio of 80%, at which a stable plasma jet can be obtained.

(v) Performance confirmation

Figure 15:
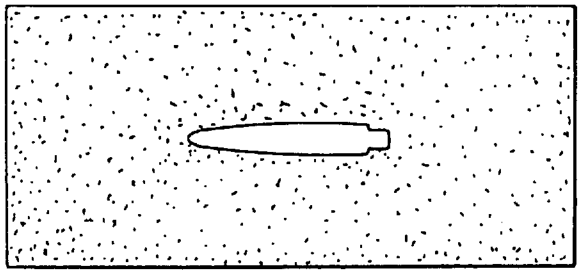
FIG. 15 shows a result of the confirmation of emission of a plasma jet and a result of the confirmation of cutting capacity.
Figure 16:
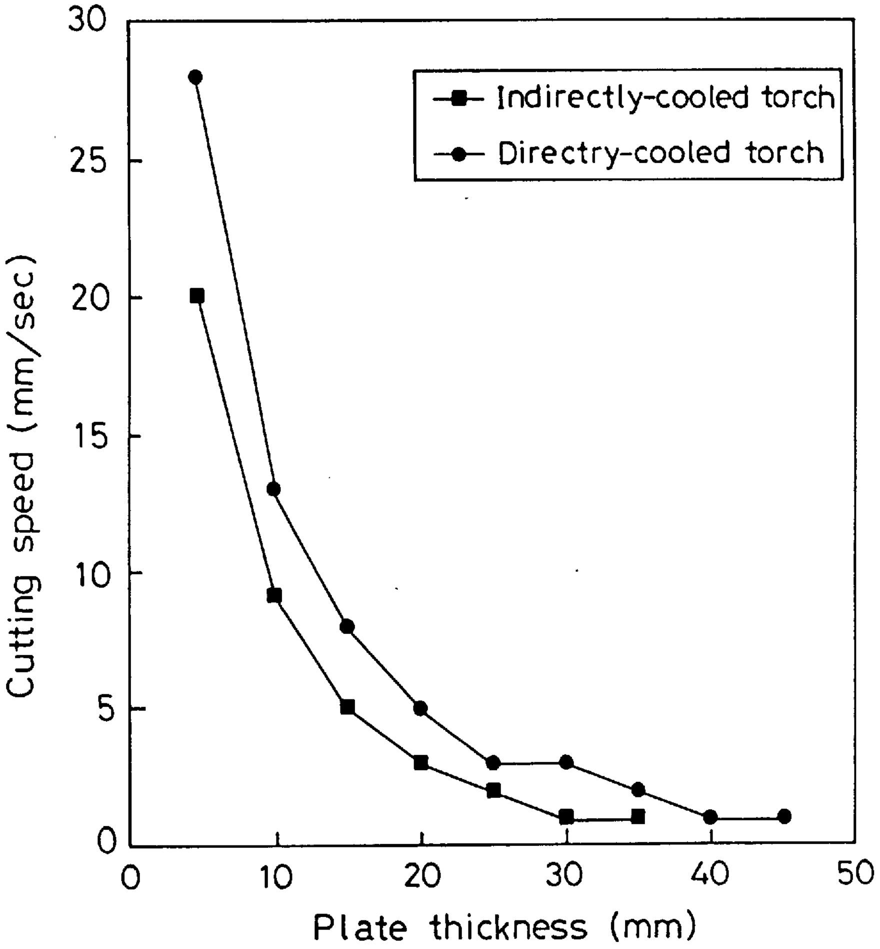
FIG. 16 is a graph comparatively showing the cutting speed of a directly-cooled plasma jet torch and that of an indirectly-cooled plasma jet torch.

We carried out tests to confirm the performance of the indirectly-cooled plasma jet torch according to the present invention in terms of the capability of emitting a stable plasma jet and the cutting capacity. As a result, it was possible for the indirectly-cooled plasma jet torch to emit a stable plasma jet as shown in FIG. 15. Results of the confirmation of the capacity of cutting a metal (SUS304) revealed that the indirectly-cooled plasma jet torch was capable of cutting a metal plate having a thickness of about 35 millimeters under the conditions that the cutting current was 250 A, the stand-off [i.e. the distance between the distal end of the torch (tip) and the surface of the workpiece] was 5 millimeters, and the cutting speed was 1 millimeter/sec. Accordingly, as shown in FIG. 16, the cutting capacity of the indirectly-cooled plasma jet torch was about 20% lower than the cutting capacity of the directly-cooled plasma jet torch (capable of cutting a metal plate having a thickness of 45 millimeters under the same conditions). However, considering that the indirectly-cooled plasma jet torch has limitations (in terms of the heat conduction, the structure, the machining accuracy in production, etc.) because cooling of the tip is effected through the metal (nozzle sleeve), and there is also a limit in the thermal pinch effect obtained by the indirectly-cooled tip, the performance of the indirectly-cooled plasma jet torch can be said to be sufficient for practical use.

Thus, the present invention provides the following advantages:

① A stable plasma jet can be obtained by specifying the tip cooling time within the range of from 0.37 second to 1.64 seconds.

② Considering the machining accuracy in production, it is preferable that the surface contact ratio between the tip and the nozzle sleeve should be set at 80%. With this surface contact ratio, it is possible to obtain the same cooling efficiency (0.96 second) as that at the surface contact ratio 90%.

③ It is possible to obtain a stable plasma jet by producing a tip and a nozzle sleeve (made of the same material as that of the tip) such that their contact portions are tapered to increase the surface contact ratio between the tip and the nozzle sleeve to 70% or more, and by providing at least one of the contact portions with Ag plating of 6 micrometers in thickness to interpose a different kind of metal between the contact portions of the tip and the nozzle sleeve.

④ With the establishment of an indirect cooling system for the plasma jet cutting method, there is no longer leakage of cooling water even during an operation of replacing expendable parts such as tips. Thus, an improvement in maintenance is achieved. Moreover, it becomes possible to prevent radioactive contamination of cooling water.

⑤ The indirectly-cooled plasma jet torch makes it possible to obtain a stable plasma jet equal to the plasma jet obtained with the directly-cooled plasma jet torch. It is also possible to cut a metal plate (SUS304) having a thickness of about 35 millimeters under the conditions that the current is 250 A, the stand-off is 5 millimeters, and the cutting speed is 1 millimeter/second.

What we claim is:

1. A plasma jet torch comprising:

a nozzle sleeve having a tubular shape with an annular chamber through which a cooling fluid is circulated and an end with a tapered end surface extending from an outer diameter to an inner diameter of said nozzle sleeve;

a nozzle tip shaped to cup around said end of said nozzle sleeve cooled by said cooling fluid, said nozzle tip being indirectly cooled by surface contact with said end of said nozzle sleeve, said nozzle tip having a tapered portion extending from an outer diameter to an inner diameter of said nozzle tip fitted over said tapered end surface of said nozzle sleeve; and an electrode extending axially through said nozzle sleeve and providing an electric discharge induced between said electrode and said nozzle tip.

2. A plasma jet torch according to claim 1, wherein said tapered end surface of said nozzle sleeve and said tapered portion of said nozzle tip taper at a ratio of 1/50 from said respective outer diameters to said respective inner diameters.

3. A plasma jet torch according to claim 1, wherein the surface contact between said nozzle tip and said nozzle sleeve is 70% or more.

4. A plasma jet torch according to claim 1, wherein said nozzle tip and said nozzle sleeve are made of the same material and at least one of said nozzle tip and said nozzle sleeve has an Ag plating at the surface contact between said nozzle tip and said nozzle sleeve.

* * * * *